United States Patent
Adamo

Patent Number: 5,914,652
Date of Patent: Jun. 22, 1999

[54] OBJECT SENSING DEVICE FOR A VEHICLE

[76] Inventor: Philip C. Adamo, 1506 Sycamore Ave., Willow Grove, Pa. 19090

[21] Appl. No.: 09/031,509

[22] Filed: Feb. 26, 1998

[51] Int. Cl.$^6$ .................................................... B60Q 1/00
[52] U.S. Cl. ........................ 340/436; 340/903; 340/904; 180/169; 367/909
[58] Field of Search .................... 340/435, 436, 340/901, 903, 904; 180/169; 367/909; 342/70, 71, 72

[56] References Cited

U.S. PATENT DOCUMENTS

| | | | |
|---|---|---|---|
| D. 342,929 | 1/1994 | Spencer | D12/193 |
| 3,842,397 | 10/1974 | Sindle | 340/435 |
| 4,097,864 | 6/1978 | Endo et al. | 343/7 VM |
| 4,208,658 | 6/1980 | Fujiki et al. | 343/7 VM |
| 4,467,313 | 8/1984 | Yoshino et al. | 340/904 |
| 4,477,184 | 10/1984 | Endo | 180/169 |
| 4,674,073 | 6/1987 | Naruse | 340/904 |
| 4,694,295 | 9/1987 | Miller et al. | 340/903 |
| 4,891,624 | 1/1990 | Ishikawa et al. | 340/436 |
| 4,943,796 | 7/1990 | Lee | 340/435 |
| 5,122,796 | 6/1992 | Beggs et al. | 340/904 |
| 5,281,947 | 1/1994 | Durley et al. | 340/433 |
| 5,319,350 | 6/1994 | DeMarco et al. | 340/435 |
| 5,572,484 | 11/1996 | Gaus et al. | 340/435 |
| 5,754,123 | 5/1998 | Nashif et al. | 340/903 |
| 5,786,772 | 7/1998 | Schofield et al. | 340/903 |

*Primary Examiner*—Nina Tong

[57] ABSTRACT

A new object sensing device for a vehicle for alerting a driver of a vehicle while backing up of an object or obstruction that is close to the vehicle. The inventive device includes a mounting frame which is mountable to a license plate of a vehicle. A transmitter for transmitting a signal is provided on the mounting frame. Also provided on the mounting frame is a receiver for receiving a signal transmitted from the transmitter and reflected off of an object towards the receiver. A control panel is operatively connected to the receiver. The control panel has a plurality of indicators for indicating to a user a reflect signal received by the receiver. The control panel is mountable in the interior of a vehicle.

8 Claims, 2 Drawing Sheets

OBJECT SENSING DEVICE FOR A VEHICLE

BACKGROUND OF THE INVENTION

1. Field of the Invention

The present invention relates to devices for aiding the backing up of vehicles and more particularly pertains to a new object sensing device for a vehicle for alerting a driver of a vehicle while backing up of an object or obstruction that is close to the vehicle.

2. Description of the Prior Art

The use of devices for aiding the backing up of vehicles is known in the prior art. More specifically, devices for aiding the backing up of vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for aiding the backing up of vehicles include U.S. Pat. No. 4,891,624; U.S. Pat. No. 4,097,864; U.S. Pat. No. 4,208,658; U.S. Pat. No. 4,477,184; U.S. Pat. No. Des. 342,929; and U.S. Pat. No. 5,281,947.

While these devices fulfill their respective, particular objectives and requirements, the aforementioned patents do not disclose a new object sensing device for a vehicle. The inventive device includes a mounting frame which is mountable to a license plate of a vehicle. A transmitter for transmitting a signal is provided on the mounting frame. Also provided on the mounting frame is a receiver for receiving a signal transmitted from the transmitter and reflected off of an object towards the receiver. A control panel is operatively connected to the receiver. The control panel has a plurality of indicators for indicating to a user a reflect signal received by the receiver. The control panel is mountable in the interior of a vehicle.

In these respects, the object sensing device for a vehicle according to the present invention substantially departs from the conventional concepts and designs of the prior art, and in so doing provides an apparatus primarily developed for the purpose of alerting a driver of a vehicle while backing up of an object or obstruction that is close to the vehicle.

SUMMARY OF THE INVENTION

In view of the foregoing disadvantages inherent in the known types of devices for aiding the backing up of vehicles now present in the prior art, the present invention provides a new object sensing device for a vehicle construction wherein the same can be utilized for alerting a driver of a vehicle while backing up of an object or obstruction that is close to the vehicle.

The general purpose of the present invention, which will be described subsequently in greater detail, is to provide a new object sensing device for a vehicle apparatus and method which has many of the advantages of the devices for aiding the backing up of vehicles mentioned heretofore and many novel features that result in a new object sensing device for a vehicle which is not anticipated, rendered obvious, suggested, or even implied by any of the prior art devices for aiding the backing up of vehicles, either alone or in any combination thereof.

To attain this, the present invention generally comprises a mounting frame which is mountable to a license plate of a vehicle. A transmitter for transmitting a signal is provided on the mounting frame. Also provided on the mounting frame is a receiver for receiving a signal transmitted from the transmitter and reflected off of an object towards the receiver. A control panel is operatively connected to the receiver. The control panel has a plurality of indicators for indicating to a user a reflect signal received by the receiver. The control panel is mountable in the interior of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new object sensing device for a vehicle apparatus and method which has many of the advantages of the devices for aiding the backing up of vehicles mentioned heretofore and many novel features that result in a new object sensing device for a vehicle which is not anticipated, rendered obvious, suggested, or even implied by any of the prior art devices for aiding the backing up of vehicles, either alone or in any combination thereof.

It is another object of the present invention to provide a new object sensing device for a vehicle which may be easily and efficiently manufactured and marketed.

It is a further object of the present invention to provide a new object sensing device for a vehicle which is of a durable and reliable construction.

An even further object of the present invention is to provide a new object sensing device for a vehicle which is susceptible of a low cost of manufacture with regard to both materials and labor, and which accordingly is then susceptible of low prices of sale to the consuming public, thereby making such object sensing device for a vehicle economically available to the buying public.

Still yet another object of the present invention is to provide a new object sensing device for a vehicle which provides in the apparatuses and methods of the prior art some of the advantages thereof, while simultaneously overcoming some of the disadvantages normally associated therewith.

Still another object of the present invention is to provide a new object sensing device for a vehicle for alerting a driver of a vehicle while backing up of an object or obstruction that is close to the vehicle.

Yet another object of the present invention is to provide a new object sensing device for a vehicle which includes a mounting frame which is mountable to a license plate of a vehicle. A transmitter for transmitting a signal is provided on the mounting frame. Also provided on the mounting frame is a receiver for receiving a signal transmitted from the transmitter and reflected off of an object towards the receiver. A control panel is operatively connected to the receiver. The control panel has a plurality of indicators for indicating to a user a reflect signal received by the receiver. The control panel is mountable in the interior of a vehicle.

Still yet another object of the present invention is to provide a new object sensing device for a vehicle that helps drivers of vehicles avoid hitting objects, especially objects in the driver's blind spots, while backing up.

Even still another object of the present invention is to provide a new object sensing device for a vehicle that fits over the license plate of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
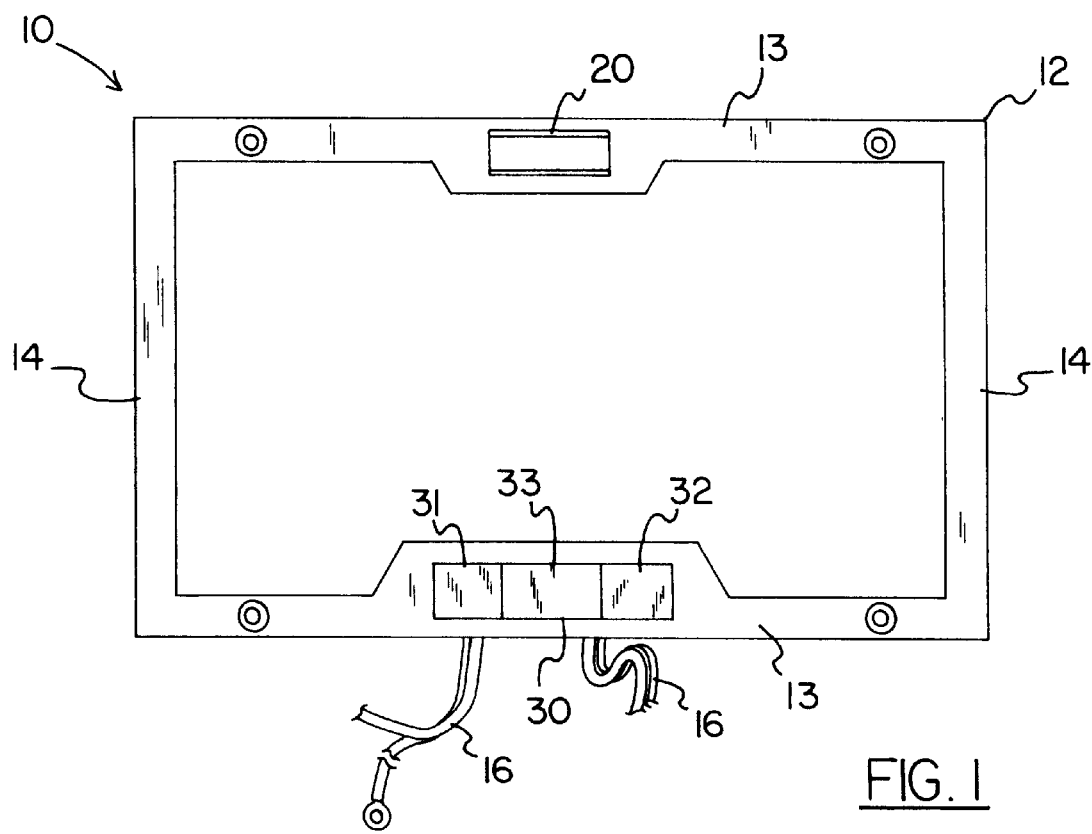
FIG. 1 is a schematic side view of a mounting frame of a new object sensing device for a vehicle according to the present invention.
Figure 2:
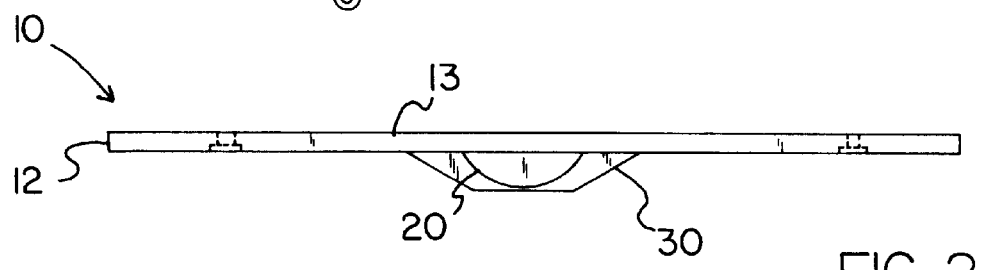
FIG. 2 is a schematic top side view of the mounting plate of the present invention.
Figure 3:
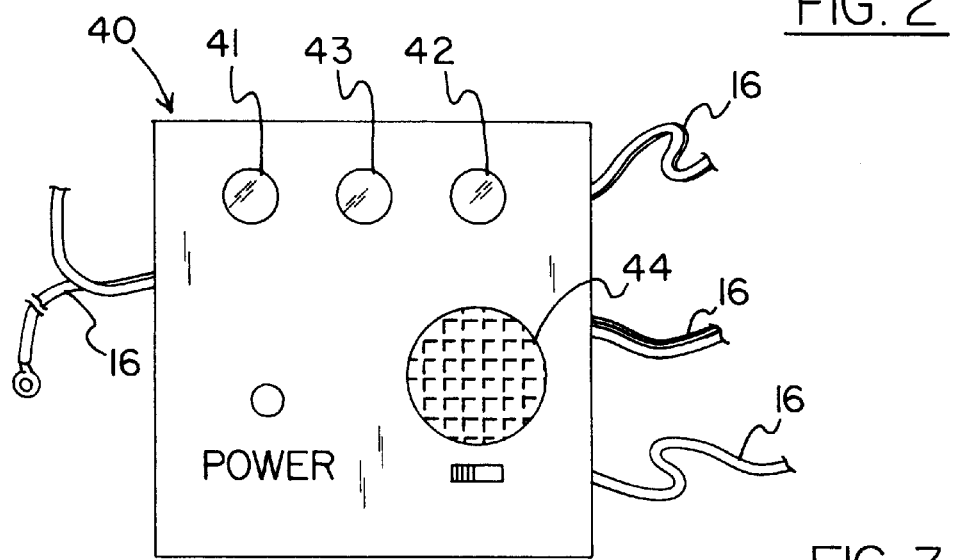
FIG. 3 is a schematic side view of the control panel of the present invention.
Figure 4:
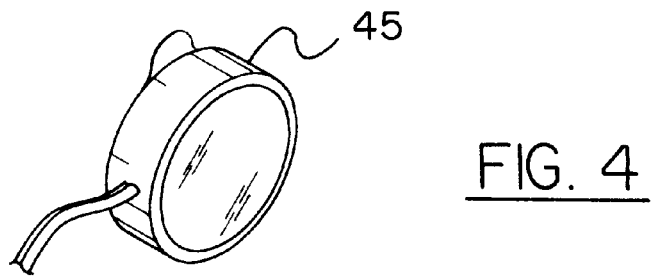
FIG. 4 is a schematic perspective view of the fifth indicator of the present invention.
Figure 5:
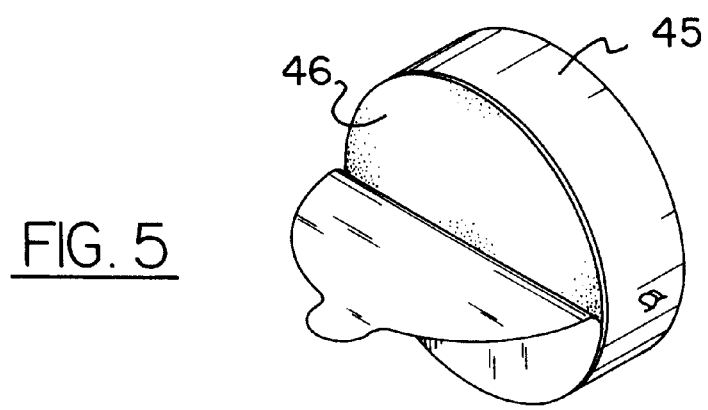
FIG. 5 is a schematic rear perspective view of the fifth indicator of the present invention.
Figure 6:
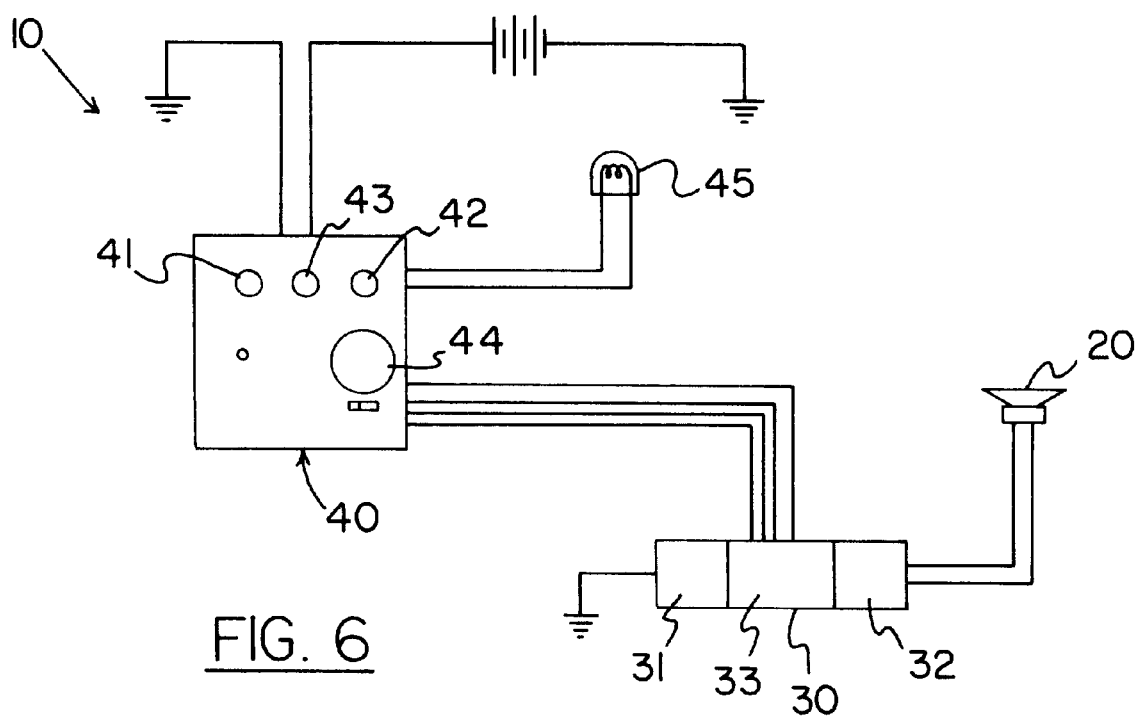
FIG. 6 is a electrical schematic of the present invention.

With reference now to the drawings, and in particular to FIGS. 1 through 6 thereof, a new object sensing device for a vehicle embodying the principles and concepts of the present invention and generally designated by the reference numeral 10 will be described.

As best illustrated in FIGS. 1 through 6, the object sensing device for a vehicle 10 generally comprises a mounting frame 12 which is mountable to a license plate of a vehicle. A transmitter 20 for transmitting a signal is provided on the mounting frame 12. Also provided on the mounting frame 12 is a receiver 30 for receiving a signal transmitted from the transmitter 20 and reflected off of an object towards the receiver 30. A control panel 40 is operatively connected to the receiver 30. The control panel 40 has a plurality of indicators 41,42,43,44,45 for indicating to a user a reflected signal received by the receiver 30. The control panel 40 is mountable in the interior of a vehicle.

In use, the object sensing device 10 is designed for mounting to a license plate, preferably on the rear of the vehicle so that a driver is alerted to objects near the vehicle, and especially in the driver's blind spots, while backing up so that the driver may avoid hitting the objects with the vehicle.

In closer detail, the mounting frame 12 is generally rectangular and has a first or long pair of opposite elongate sides 13 and a second or short pair of opposite elongate sides 14 extending between the first pair of sides 13. The mounting frame 12 is mountable to a license plate of a vehicle, especially on the rear of the vehicle.

The transmitter 20 for transmitting a signal is provided on the mounting frame 12. Preferably, the transmitter 20 is located on one of the sides of the first pair of sides 13 at a midpoint on the length of the side of the first pair of sides 13. Ideally, the signal transmitted by the transmitter 20 is of the type used in autofocusing devices in cameras and includes devices generating light or sound.

The receiver 30 is designed for receiving a signal transmitted from the transmitter 20 and reflected off of an object towards the receiver 30. The receiver 30 is provided on the mounting frame 12 and is preferably located on the other side of the first pair of sides 13 of the mounting frame 12. The receiver 30 has a plurality of detectors 31,32,33 for detecting a reflected signal. A first detector 31 detects signals reflected coming from a first region. A second detector 32 detects signals reflected coming from a second region. A third detector 33 detects signals reflected coming from a third region. Illustratively, the first region is located or directed towards one side of a vehicle, the second region is located or directed towards another side of a vehicle, and the third region is located or directed between the first and second regions.

The control panel 40 is operatively connected by wires 16 to the receiver 30 and the transmitter 20, as well as the power source of the vehicle. The control panel 40 has a plurality of indicators 41,42,43,44,45 for indicating to a user a reflect signal received by the receiver 30. The control panel 40 is mountable in the interior of a vehicle. First, second, and third indicators 41,42,43 are designed for indicating a reflected signal received by their associated detector 31,32, 33 which came from their respective region. Ideally, the first, second, and third indicators 41,42,43 are visible light emitting, or LED's, for permitting a driver to know the exact region where an obstacle is located. The control panel 40 includes a fourth indicator 44 which is designed for indicating a reflected signal received by the receiver 30 from any of the detectors. Preferably, the fourth indicator 44 has a speaker that emits an audible signal. Ideally, the control panel 40 includes a fifth indicator 45 which is mountable to a rear view mirror of a vehicle, preferably by an adhesive 46. The fifth indicator 45 is a visible light emitting device for aiding a driver avoid objects when the user is using the rear view mirror.

In use, the transmitter sends signals outwards which are reflected back towards the detectors of the receiver when they signals hit an obstacle. The transmitter may be calibrated to transmit signals that hit obstacles a short distance from the transmitter (and the rear of the vehicle). When detected, the reflected signals of close objects are indicated by the indicators of the control panel. Depending on the region where the object is, that is from which region the reflected signals are in, the appropriate indicator is activated to warn a driver of an obstacle and the generally location of the obstacle in relation to the vehicle (that is the obstacle to the right or left of the vehicle or is it head on).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An object sensing device for a vehicle, comprising:
    a mounting frame being generally rectangular and having a first pair of opposite sides and a second pair of opposite sides being extended between said first pair of sides, said mounting frame being mountable to a license plate of a vehicle;
    a transmitter for transmitting a signal being provided on said mounting frame;
    a receiver for receiving a signal transmitted from said transmitter and reflected off of an object towards said receiver, said receiver being provided on said mounting frame; and
    a control panel being operatively connected to said receiver, said control panel having a plurality of indicators for indicating to a user a reflect signal received by said receiver, said control panel being mountable in the interior of a vehicle except the rear view mirror;
    wherein said control panel further comprises an additional visual auxiliary indicator connected and extended from the exterior of said control panel via a wire, said visual auxiliary indicator being mountable to a rear view mirror, wherein said visual auxiliary indicator is a visible light emitting device.

2. The device of claim 1, wherein said transmitter is located on one of the sides of said first pair of sides of said mounting frame, and wherein said receiver is located on another side of said first pair of sides of said mounting frame.

3. The device of claim 1, wherein said receiver has a plurality of detectors for detecting a reflected signal, wherein a first detector detects signals reflected from a first region, wherein a second detector detects signals reflected from a second region, and wherein a third detector detects signals reflected from a third region.

4. The device of claim 1, wherein said indicators of said control panel include first, second and third indicators, said first indicator being for indicating a reflected signal received by said first detector, said second indicator being for indicating a reflected signal received by said second detector, said third indicator being for indicating a reflected signal received by said third detector.

5. The device of claim 4, wherein said first, second, and third indicators are visible light emitting.

6. The device of claim 4, wherein said indicators of said control panel include a fourth indicator, said fourth indicator being for indicating a reflected signal received by said receiver, and wherein said fourth indicator emits an audible signal.

7. The device of claim 1, wherein the visual auxiliary indicator has a rear face with adhesive thereon for being coupled to the rear view mirror.

8. An object sensing device for a vehicle, comprising:
    a mounting frame being generally rectangular and having a first pair of opposite sides and a second pair of opposite sides being extended between said first pair of sides, said mounting frame being mountable to a license plate of a vehicle;
    a transmitter for transmitting a signal being provided on said mounting frame, wherein said transmitter is located on one of the sides of said first pair of sides;
    a receiver for receiving a signal transmitted from said transmitter and reflected off of an object towards said receiver, said receiver being provided on said mounting frame; wherein said receiver is located on another side of said first pair of sides;
    said receiver having a plurality of detectors for detecting a reflected signal, wherein a first detector detects signals reflected from a first region, wherein a second detector detects signals reflected from a second region, wherein a third detector detects signals reflected from a third region;
    a control panel being operatively connected to said receiver, said control panel having a plurality of indicators for indicating to a user a reflect signal received by said receiver, said control panel being mountable in the interior of a vehicle;
    wherein said indicators include first, second and third indicators, said first indicator being for indicating a reflected signal received by said first detector, said second indicator being for indicating a reflected signal received by said second detector, said third indicator being for indicating a reflected signal received by said third detector, wherein said first, second, and third indicators are visible light emitting;
    wherein said indicators of said control panel include a fourth indicator, said fourth indicator being for indicating a reflected signal received by said receiver, wherein said fourth indicator emits an audible signal; and
    wherein said indicators of said control panel include a fifth indicator, said fifth indicator being mountable to a rear view mirror, wherein said fifth indicator is a visible light emitting device.

* * * * *